US012577143B2

(12) United States Patent (10) Patent No.: US 12,577,143 B2
Rosenberger et al. (45) Date of Patent: Mar. 17, 2026

(54) ANTI-RESONANCE ELEMENT PREFORM FOR PRODUCING AN ANTI-RESONANT HOLLOW-CORE FIBER

(71) Applicant: Heraeus Quarzglas GmbH & Co. KG, Hanau (DE)

(72) Inventors: Manuel Rosenberger, Hanau (DE); Jaqueline Plass, Hanau (DE); Kay Schuster, Bitterfeld-Wolfen (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 176 days.

(21) Appl. No.: 18/257,024

(22) PCT Filed: Nov. 12, 2021

(86) PCT No.: PCT/EP2021/081455
§ 371 (c)(1),
(2) Date: Jun. 12, 2023

(87) PCT Pub. No.: WO2022/128272
PCT Pub. Date: Jun. 23, 2022

(65) Prior Publication Data
US 2024/0043312 A1 Feb. 8, 2024

(30) Foreign Application Priority Data
Dec. 16, 2020 (EP) .................................... 20214427

(51) Int. Cl.
*G02B 6/032* (2006.01)
*C03B 37/012* (2006.01)
*G02B 6/02* (2006.01)

(52) U.S. Cl.
CPC ...... *C03B 37/0122* (2013.01); *G02B 6/02328* (2013.01); *G02B 6/032* (2013.01); *C03B 2203/16* (2013.01)

(58) Field of Classification Search
CPC ............................ G02B 6/02328; G02B 6/032
See application file for complete search history.

(56) References Cited

U.S. PATENT DOCUMENTS 10,859,763 B2 12/2020 Xu et al.
11,009,654 B2 5/2021 Wang et al.
(Continued)

FOREIGN PATENT DOCUMENTS

CN 105807363 A 7/2016
CN 109283612 A 1/2019
(Continued)

OTHER PUBLICATIONS

Low-loss Hollow-core Anti-Resonant Fibers with Semi-Circular Nested Tubes, IEEE Journal of Selected Topics in Quantum Electronics, 2016.
(Continued)

*Primary Examiner* — Eric Wong
(74) *Attorney, Agent, or Firm* — Panitch Schwarze Belisario & Nadel LLP

(57) ABSTRACT

The invention relates to an anti-resonance ele-ment preform for producing an anti-resonant hollow-core fiber, in an axial top view comprising a circular first cir-cle element with a first circle radius and a circular arc-shaped first circular arc element with a first circular arc radius. Furthermore, the invention relates to a method for producing an anti reso-nance element preform, a preform for producing an anti-resonant hollow-core fiber comprising at least one anti-resonance element preform and an anti-resonant hol-low-core fiber. According to the invention, it is provided that the first circle element and the first circular arc element are connected to one another at two contact points.

13 Claims, 12 Drawing Sheets

(56) References Cited

U.S. PATENT DOCUMENTS

| | | | |
|---|---|---|---|
| 12,099,234 B2* | 9/2024 | Rosenberger | ..... C03B 37/01245 |
| 2017/0160467 A1 | 6/2017 | Poletti et al. | |
| 2018/0267235 A1 | 9/2018 | Russell et al. | |
| 2019/0101695 A1* | 4/2019 | Poletti | ................... H01S 3/1618 |
| 2020/0156987 A1 | 5/2020 | Wheeler et al. | |
| 2020/0241200 A1 | 7/2020 | Wang et al. | |
| 2020/0257041 A1* | 8/2020 | Xu | .................... C03B 37/02781 |
| 2021/0349256 A1* | 11/2021 | Gao | ................... G02B 6/02328 |
| 2021/0382227 A1 | 12/2021 | Wang et al. | |
| 2022/0356108 A1* | 11/2022 | Rosenberger | ..... C03B 37/01234 |

FOREIGN PATENT DOCUMENTS

| | | | | | |
|---|---|---|---|---|---|
| CN | 110515152 A | | 11/2019 | | |
| CN | 209728226 U | | 12/2019 | | |
| CN | 110673256 A | | 1/2020 | | |
| CN | 111201459 A | | 5/2020 | | |
| CN | 111458787 A | | 7/2020 | | |
| CN | 111474627 A | | 7/2020 | | |
| CN | 111474628 A | | 7/2020 | | |
| EP | 3136143 A1 | | 3/2017 | | |
| GB | 2583352 A | * | 10/2020 | ....... | B29D 11/00663 |
| JP | 2017520804 A | | 7/2017 | | |
| JP | 2018533042 A | | 11/2018 | | |
| JP | 2020525391 A | | 8/2020 | | |
| WO | 2015/185761 A1 | | 12/2015 | | |
| WO | 2020217052 A1 | | 10/2020 | | |

OTHER PUBLICATIONS

Habib MD Selim, et al., "Low-Loss Hollow-Core Anti-Resonant Fibers With Semi-Circular Nested Tubes", IEEE Journal of Selected Topics in Quantum Electronics, IEEE Service Center, Piscataway, NJ, US, vol. 22, No. 2, Mar. 1, 2016 (Mar. 1, 2016), pp. 1-6, XP011603983, ISSN: 1077-260X, DOI: 10.1109/JSTQE.2015.2512989 [retrieved on Mar. 21, 2016] Seite 4402106: II. Numerical analysis; figures 1-6, 8, 9, 11.

Andrey D. Pryamikov, et al., "Demonstration of a waveguide regime for a silica hollow-core microstructured optical fiber with a negative curvature of the core boundary in the spectral region > 35 [mu] m", Optics Express,vol. 19, No. 2,Jan. 17, 2011 (Jan. 17, 2011), p. 1441, XP055222321,US, ISSN: 2161-2072, DOI: 10.1364/OE.19.001441 Seiten 1445-1446: 3. Experimental results; figure 4.

AF Kosolapov, et al., "Hollow-core revolver fibre with a double-capillary reflective cladding", Quantum Electronics., vol. 46, No. 3, Mar. 29, 2016 (Mar. 29, 2016) , pp. 267-270, XP055502520, GB ISSN: 1063-7818, DOI: 10.1070/QEL15972 p. 268; figure 2.

Gao et al., "Hollow-core conjoined-tube negative-curvature fibre with ultralow loss," Nature Communications, vol. 9, No. 2828, pp. 1-6 (2018).

Hasan et al., "Positive and negative curvatures nested in an antiresonant hollow-core fiber," Optics Letters, vol. 42, Issue 4, pp. 703-706 (2017).

Jasion et al., "Novel Antiresonant Hollow Core Fiber Design with Ultralow Leakage Loss Using Transverse Power Flow Analysis," Optical Fiber Communication Conference (OFC), OSA Technical Digest (Optical Society of America (2019).

Office Action issued Oct. 14, 2025 in JP Application No. 2024194616.
Office Action issued Oct. 14, 2025 in JP Application No. 2024194617.
Poletti, F., "Nested antiresonant nodeless hollow core fiber," Optics Express, vol. 22, No. 20, pp. 23807-23828 (2014).
Shaha et al., "Low loss double cladding nested hollow core antiresonant fiber," OSA Continuum, vol. 3, Issue 9, pp. 2512-2524 (2020).

* cited by examiner

ANTI-RESONANCE ELEMENT PREFORM FOR PRODUCING AN ANTI-RESONANT HOLLOW-CORE FIBER

The invention relates to an anti-resonance element preform for producing an anti-resonant hollow-core fiber, in an axial top view comprising a circular first circle element with a first circle radius and a circular arc-shaped first circular arc element with a first circular arc radius.

Furthermore, the invention relates to a method for producing an anti-resonance element preform, a preform for producing an anti-resonant hollow-core fiber comprising at least one anti-resonance element preform, and an anti-resonant hollow-core fiber.

BACKGROUND OF THE INVENTION

Conventional single-mode optical fibers of solid material have a core region of glass surrounded by a cladding region of glass with a lower refractive index. The light guidance is thereby based on total reflection between core and cladding region. However, the interactions of the guided light with the solid material are associated with an increased latency during the data transmission and relatively low damage thresholds compared to high-energy radiation.

"Hollow-core fibers", in which the case the core comprises an evacuated cavity that is filled with gas or liquid, avoid or reduce these disadvantages. In hollow-core fibers, the interaction of the light with the glass is smaller than in solid core fibers. The refractive index of the core is smaller than that of the cladding, so that a light guidance by means of total reflection is not possible and the light would usually escape from the core into the cladding. Depending on the physical mechanism of the light guidance, the hollow-core fibers are divided into "photonic bandgap fibers" and "anti-resonant hollow-core fibers".

In the case of "photonic bandgap fibers", the hollow core region is surrounded by a cladding, in which small hollow ducts are arranged periodically. The periodic structure of the hollow ducts in the cladding causes an effect that is referred to as "photonic bandgap" in the semiconductor technology, according to which the light of certain wavelength ranges scattered at the cladding structures interferes constructively, due to Bragg reflection in the central cavity and cannot propagate transversely in the cladding.

In the case of the embodiment of the hollow-core fiber, which is referred to as "anti-resonant hollow-core fiber" (ARHCF), the hollow core region is surrounded by an inner cladding region, in which the so-called "anti-resonant elements" (or "anti-resonance elements"; in short "AREs") are arranged. The walls of the anti-resonance elements, which are evenly distributed around the hollow core, can act as Fabry-Perot cavities, which are operated in anti-resonance, reflect the incident light and guide it through the fiber core.

This fiber technology promises a low optical attenuation, a very broad transmission spectrum (also in the UV or IR wavelength range), and a small latency during the data transmission.

Potential applications of the hollow-core fibers are in the field of the data transmission, the high-performance beam guidance, for example for the material processing, the modal filtration, the non-linear optics, in particular for the supercontinuum generation, from the ultraviolet to the infrared wavelength range.

PRIOR ART

One disadvantage of the anti-resonant hollow-core fibers is that modes of a higher order are not necessarily suppressed, so that they are often not purely of a single mode over large transmission lengths, and the quality of the output beam deteriorates.

In the paper by Francesco Poletti "Nested antiresonant nodeless hollow core fiber"; Optics Express, Vol. 22, No. 20 (2014); DOI: 10.1364/OE 22.023807, a fiber design is proposed, in the case of which anti-resonance elements are not formed as a simple singular structural element, but consist of several structural elements, which are nested. The nested anti-resonance elements are designed in such a way that the core modes of a higher order are phase-adapted to the cladding modes and are suppressed, but not the fundamental core mode. The propagation of the fundamental core mode is thus always ensured, and the hollow-core fiber can be effectively made of a single mode over a limited wavelength range.

The effective mode suppression depends on the center wavelength of the transmitted light and on the structural parameters of the fiber design, such as the hollow core radius and the diameter difference of nested ring structures in the anti-resonance elements.

An anti-resonant hollow-core fiber is known from EP 3 136 143 A1 (referred to therein as "hollow-core fiber without bandgap"), in which case the core can also guide further modes, in addition to the fundamental mode. For this purpose, the said core is surrounded by an inner cladding comprising "non-resonant elements", which provide a phase adaptation of anti-resonant modes with the higher modes. The production of the hollow-core fiber takes place according to a so-called "stack-and-draw" technique, in which the output elements are arranged to form an axially parallel ensemble and are fixed to build a preform, which is subsequently elongated. A cladding tube comprising a hexagonal inner cross section is used thereby, and six so-called "ARE preforms" (anti-resonance element preforms) are fixed in the inner edges of the cladding tube. This preform is stretched in two stages to form a hollow-core fiber.

An anti-resonant hollow-core fiber is known from WO 2015/185761 A1, in the case of which further tubular, so-called "nested elements" are arranged inside the first tubular "non-resonant elements", which together form the anti-resonance elements.

One disadvantage in the production of this assembly is the relatively large contact point, which results by means of a connection of a "nested" tube inside the first non-resonant elements and already leads to negative impacts on the efficiency of the light guidance of the fiber at a slight deviation from the ideal structure. A further disadvantage results in the small range of variation for the design of the anti-resonance elements when exclusively using tubular elements.

An anti-resonant hollow-core fiber is known from CN 111 474 627 A, at which an anti-resonance element is shaped from a circle element and a circular arc element in axial top view. Circle element and circular arc element are not connected to one another, but in each case directly to a cladding of the fiber. From a production-related aspect, this has the disadvantage that a pre-production of anti-resonance element preforms, which form the anti-resonance elements in the finally stretched fiber, is not possible, but all structural elements have to be connected directly to a cladding tube. This ensures a high susceptibility with regard to deviations from the ideal arrangements of the structural elements to one another, and thus a loss of efficiency during the light guidance.

An anti-resonant hollow-core fiber is known from US 2020/0241200 A1, whose anti-resonance elements comprise a circle element and a structural element shaped in a straight manner without curvature, in an axial top view. A disadvantage of structural elements, which are shaped in a straight manner, in the case of anti-resonance elements, is a light guidance, which is inferior compared to curved structural elements and which has a negative impact on the optical properties, such as, for example, the optical attenuation of the fiber.

OBJECTS

An object of the present invention is to at least partially overcome one or several of the disadvantages resulting from the prior art.

Specifically, the invention is based on the goal of providing anti-resonance element preforms, from which anti-resonant hollow-core fibers with good optical properties, for example a low optical attenuation, can be produced easily and in a reproducible manner.

A further goal of the invention is to provide a method, by means of which anti-resonance element preforms can be produced with high precision and good optical properties, such as, for example, a low optical attenuation, in a reproducible manner.

A further goal of the invention is to specify a method for the cost-efficient production of a preform for an anti-resonant hollow-core fiber, which avoids the limitations of conventional production methods.

A further goal of the invention is to provide preforms for producing an anti-resonant hollow-core fiber, which avoids the limitations of conventional preforms.

A further goal of the invention is to provide an anti-resonant hollow-core, which avoids the limitations of conventional hollow-core fibers.

PREFERRED EMBODIMENTS OF THE INVENTION

The features of the independent claims contribute to the at least partially fulfilling of at least one of the above-mentioned objects. The dependent claims provide preferred embodiments, which contribute to at least partially fulfilling at least one of the objects.

/1/ An anti-resonance element preform for producing an anti-resonant hollow-core fiber, in an axial top view comprising a circular first circle element with a first circle radius, and a circular arc-shaped first circular arc element with a first circular arc radius, characterized in that the first circle element and the first circular arc element are connected to one another at two contact points.

/2/ According to embodiment 1, an anti-resonance element preform characterized in that the first circle element and the first circular arc element comprise a glass, in particular quartz glass, in particular a quartz glass with a refractive index of at least 1.4, in particular 1.4 to 3, in particular 1.4 to 2.8, or a polymer, consist in particular of a glass, in particular of quartz glass, in particular of quartz glass with a refractive index of at least 1.4, in particular 1.4 to 3, in particular 1.4 to 2.8, or a polymer.

/3/ According to embodiment 1 or 2, an anti-resonance element preform characterized in that the anti-resonance element preform comprises a circular second circle element with a second circle radius.

/4/ According to any one of the preceding embodiments, an anti-resonance element preform characterized in that the anti-resonance element preform comprises a circular arc-shaped second circular arc element with a second circular arc radius.

/5/ According to any one of the preceding embodiments, an anti-resonance element preform characterized in that the first circle radius has a smaller magnitude than the first circular arc radius.

/6/ According to any one of the preceding embodiments, an anti-resonance element preform characterized in that the first circular arc element is arranged inside the first circle element.

/7/ According to any one of embodiments 1 to 5, an anti-resonance element preform characterized in that the first circular arc element is arranged outside of the first circle element.

/8/ A method for producing an anti-resonance element preform according to any one of embodiments 1 to 7, comprising the method steps of (a) providing a first circle element, which is circular in axial top view, with a first circle radius;

(b) providing a first circular arc element, which is circular arc-shaped in axial top view, with a first circular arc radius;

(c1) arranging the first circular arc element inside the first circle element, so that a first circular arc end and a second circular arc end are arranged on an inner side of the first circle element;

or (c2) arranging the first circular arc element outside of the first circle element, so that a first circular arc end and a second circular arc end are arranged on an outer side of the first circle element;

(d) connecting the first circular arc end and the second circular arc end to the first circle element by forming second contact points.

/9/ The method according to embodiment 8, characterized in that the connecting in method step (d) takes place by means of a heat input.

/10/ A preform for producing an anti-resonant hollow-core fiber comprising a cladding tube, characterized in that at least one anti-resonance element preform, according to any one of embodiments 1 to 7, is arranged in the cladding tube.

/11/ The preform for producing an anti-resonant hollow-core fiber according to embodiment 10, characterized in that the at least one anti-resonance element preform is connected to an inner surface of the cladding tube.

/12/ The preform for producing an anti-resonant hollow-core fiber according to embodiment 10 or 11, characterized in that 3 to 10 anti-resonance element preforms are arranged in the cladding tube.

/13/ An anti-resonant hollow-core fiber, in axial top view comprising a cladding region and at least one anti-resonance element arranged in the cladding region, as well as a circular first circle structure with a first circle structure radius and a circular arc-shaped first circular arc structure with a first circular arc structure radius, characterized in that the first circle structure and the first circular arc structure are connected to one another at two contact points.

/14/ The anti-resonant hollow-core fiber according to claim 13, produced by stretching a preform according to any one of embodiments 10 to 12.

General Matters

The range specifications in the present description include also the values mentioned as limits. Thus a designation of the type "in the range of X to Y" with regard to a variable A means that A can take the values X, Y and values between X and Y. Therefore, the ranges limited on one side of the type "up to Y" for a variable A mean Y and less than Y as a value.

Some of the described features are linked with the term "essentially". The term "essentially" is to be understood in such a way that under real conditions and manufacturing techniques a mathematically exact interpretation of terms, such as "overlapping", "perpendicular", "diameter", or "parallelism" can never be provided exactly, but only within certain manufacturing-related error tolerances. For example, "essentially perpendicular axes" draw an angle of 85 degrees to 95 degrees to one another, and "essentially identical volumes" comprise a deviation of up to 5% by volume. For example, a "device essentially consisting of quartz glass" comprises a quartz glass portion of ≥95 to ≤100% by weight. For example, an "essentially complete filling of a volume B" comprises a filling of ≥95 to ≤100% by volume of the total volume of B.

DETAILED DESCRIPTION

The invention relates to an anti-resonance element preform for producing an anti-resonant hollow-core fiber, in an axial top view comprising a circular first circle element with a first circle radius and a circular arc-shaped first circular arc element with a first circular arc radius.

To overcome the above-mentioned disadvantages in the prior art, it is provided, according to the invention, that the first circle element and the first circular arc element are connected to one another at two contact points, wherein the circular arc element is connected to the circle element in particular with a first circular arc end and with a second circular arc end opposite to the first circular arc end. The first circular arc end and the second circular arc end are to be understood as the corner points of the first circular arc element, which are visible in axial top view onto the antiresonance element preform and between which the first circular arc element extends in a circular arc-shaped manner.

An anti-resonance element preform constructed in this way can be produced separately from the other components for producing an anti-resonant hollow-core fiber, which is advantageous from a production-related point of view. Anti-resonance element preforms, which differ from the ideal structure, for example during the production thereof, can thus be disposed of in a relatively cost-efficient manner, without also having to dispose of further components for producing the anti-resonant hollow-core fiber. Through the pre-production of the anti-resonance element preforms, a uniformity can additionally be attained over an entire production batch, which advantageously affects the symmetry of the preforms produced with the anti-resonance element preforms, and ultimately also of the anti-resonant hollow-core fibers. An increased symmetry has a positive impact on the optical properties of the hollow-core fiber.

In addition, the anti-resonance elements produced from anti-resonance element preforms of this type have proven to be components with improved optical properties in the final hollow-core fiber, which results in a lower light propagation loss (i.e. including light scattering, diffraction, absorption, and inclusion) and thus in a high data transmission capacity of the final hollow-core fiber.

It has become apparent that circular arc elements, which are connected to the circle element at two contact points, allow for a high control of the structural parameters of the anti-resonance element preform, and thus makes possible the provision of the anti-resonant hollow-core fibers with improved optical properties.

For example, the improved optical properties of the anti-resonant hollow-core fibers of this type become apparent in an optical attenuation of less than 0.15 dB/km at wavelengths between 1.0 μm and 2.5 μm or less than 1 dB/km at wavelengths of up to 0.8 μm. Any type of phenomenon, which causes a reduction of the strength of the propagated signal, without thereby having an impact on the shape thereof, is referred to as optical attenuation.

Components or component parts, which essentially turn into anti-resonance elements in the hollow-core fiber by means of simple long-molding (called also elongation) during the fiber-drawing process, are referred to as anti-resonance element preforms.

In an axial top view, i.e. in a two-dimensional view onto a longitudinal axis, the anti-resonance element preform comprises a first circle element, which, in a three-dimensional view, corresponds to a tubular structural element. The first circle element has an essentially uniform first circle radius and is thus designed to be essentially circular, wherein a radius at a first point deviates by no more than 5%, preferably by no more than 3%, more preferably by no more than 1%, most preferably by no more than 0.5%, from the radius at a further point. Thus the first circle element has an essentially uniform diameter, wherein a diameter at a first point deviates by no more than 5%, preferably by no more than 3%, more preferably by no more than 1%, most preferably by no more than 0.5%, from the diameter at a further point of the anti-resonance element preform. For example, the first circle radius can thereby lie in a range of 2 to 18 mm, preferably in a range of 3 to 16 mm, more preferably in a range of 4 to 12 mm. The first circle element has a wall thickness in the range of 0.1 mm to 3 mm, preferably 0.1 mm to 2 mm, more preferably 0.2 to 1.5 mm.

In an axial top view, i.e. in a two-dimensional view onto a longitudinal axis, the anti-resonance element preform comprises a first circular arc element, which, in a three-dimensional view, corresponds to a segment of a tubular, an essentially circular, structural element, which is cut out in parallel to the longitudinal axis or, in other words, to a curved disk. The first circular arc element has an essentially uniform first circular arc. Thus, in a three-dimensional view, the first circular arc element represents a segment, cut out in parallel to the longitudinal axis, of an essentially circular tubular structural element with a radius corresponding to the circular arc radius, wherein a radius at a first point deviates by no more than 5%, preferably by no more than 3%, more preferably by no more than 1%, most preferably by no more than 0.5%, from the radius at a further point. The first circular arc radius can thereby lie, for example, in a range of 1 to 30 mm, preferably in a range of 2 to 25 mm, more preferably in a range of 3 to 20 mm. The first circular arc element has a wall thickness in the range of 0.1 mm to 3 mm, preferably 0.1 mm to 2 mm, more preferably 0.2 to 1.5 mm.

The circle radius and the circular arc radius are to be understood in each case as the outer radius of the corresponding element. A corresponding inner radius results from the respective outer radius minus the respective wall thickness. The same applies for the corresponding diameters.

A contact point is the location, at which the first circle element and the first circular arc element are connected to one another, in particular by means of a substance-tosubstance bond. In one embodiment, the first circular arc element is connected to the first circle element with a first circular arc end and a second circular arc end that is opposite to the first circular arc end. The first circle element and the first circular arc element are connected to one another at exactly two contact points.

The contact points can be designed differently. In one embodiment, the first circle element and the first circular arc element are connected to one another at a minimum of one contact point via a fastening means, such as, for example, an adhesive, a rivet, a screw, or a nail. In a preferred design, the first circle element and the first circular arc element are connected to one another by means of a substance-to-substance bond at least at one contact point, preferably at both contact points.

To provide anti-resonance element preforms with high structural precision and improved optical properties, the first circular arc element comprises a circular arc element circumference corresponding to 10% to 85%, preferably 20% to 80%, more preferably 20% to 75%, even more preferably 20% to 70%, of the circumference of a complete circle element, which corresponds to the first circular arc radius. An advantage thereby is that the contact points are spatially located at such a distance from one another that the first circular arc element and the first circular arc are connected to one another, without the contact points merging into one another, and so that one large contact point is present instead of two disjoint contact points. A large contact point would have negative impacts on the optical light guide properties of the final glass fiber, for example by means of a local increase of the material portion, for example of glass, at the large contact point, which can lead to ovality of the anti-resonance element.

At the contact points, the first circle element and the first circular arc element draw in each case an exterior angle, which is larger than 10°, preferably larger than 15°, more preferably larger than 20°, most preferably larger than 25°. The exterior angle is thereby not larger than 160°, preferably not larger than 150°, more preferably not larger than 130°. The exterior angle is to be understood as the angle, which, in an axial top view, is drawn at the contact point between the first circle element and the convex side of the first circular arc element. This allows to provide anti-resonance element preforms with high structural precision and improved optical properties.

In an embodiment, the entire anti-resonance element preform comprises or consists of a material, which is transparent for a work light of the optical fiber, for example glass, in particular doped or undoped quartz glass (SiO2). A doping makes possible the adaptation of physical properties, such as, for example, the thermal expansion coefficient. Fluorine, chlorine and/or hydroxyl groups are preferably used as doping agents, which lower the viscosity of the quartz glass.

An embodiment of the anti-resonance element preform is characterized in that the first circle element and the first circular arc element comprise at least a glass, in particular a doped or undoped quartz glass, in particular a quartz glass with a refractive index of at least 1.4, in particular 1.4 to 3, or a polymer, such as, for example, a polymethylmethacrylate, a cycle-olefin copolymer, a polycarbonate, or a fluoropolymer. In a further design, the first circle element and the first circular arc element consist of a glass, in particular of a doped or undoped quartz glass, in particular of a quartz glass with a refractive index of at least 1.4, in particular 1.4 to 3, or a polymer, such as, for example, a polymethyl methacrylate, a cycle-olefin copolymer, a polycarbonate, or a fluoropolymer.

In an embodiment, the first circle element and the circular arc element are made of identical material. In a further design, the first circle element and the first circular arc element consist of the same material, in particular of undoped or doped quartz glass, in particular of glass with a refractive index of at least 1.4, in particular 1.4 to 3, in particular 1.4 to 2.8, wherein the amount of the doping does not exceed 0.1% by weight.

The identical material term describes the substance property of two components. The two components thereby have essentially the same chemical substance. The total mass of the different chemical elements in both parts can thereby be less than 1% by weight, in particular less than 0.5% by weight, in particular less than 0.1% by weight. The chemical composition of the two parts in particular differs by a content of contaminations of less than 500 ppm by weight, in particular less than 100 ppm by weight, and/or by a doping agent content of less than 10,000 ppm by weight, in particular less than 5,000 ppm by weight.

In an embodiment, the anti-resonance element preform consists of the first circle element and the first circular arc element.

An embodiment of the anti-resonance element preform is characterized in that the anti-resonance element preform comprises a circular second circle element with a second circle radius.

The second circle element can have the same features and properties as the above-described first circle element, wherein the second circle radius can be designed to be larger than, smaller than, or identical to the first circle radius.

In an embodiment, the second circle element is arranged inside the first circle element. In an embodiment, the first circle element and the second circle element are connected to one another, in particular by means of a substance-to-substance bond, at a contact point. In a further design, the first circular arc element and the second circle element are connected to one another, in particular by means of a substance-to-substance bond. In a further design, the second circle element is connected to the first circle element as well as to the first circular arc element, in particular by means of a substance-to-substance bond.

In a further embodiment, the first circle element is arranged inside the second circle element, wherein the first circle element and the second circle element are preferably connected to one another at a contact point, in particular by means of a substance-to-substance bond.

In a further embodiment, the second circle element is arranged inside a space, which is enclosed by the first circle element and the first circular arc element, wherein the second circle element is connected, in particular by means of a substance-to-substance bond, either to the first circle element, to the first circular arc element, or to the first circle element and the first circular arc element.

An embodiment of the anti-resonance element preform is characterized in that the anti-resonance element preform comprises a circular arc-shaped second circular arc element with a second circular arc radius.

The second circular arc element can have the same features and properties as the above-described first circular arc element, wherein the second circular arc radius can be larger than, smaller than, or identical to the first circular arc radius.

In an embodiment, the second circular arc element is arranged inside the first circle element, wherein the first circle element and the second circular arc element are preferably connected to one another at two contact points, in particular by means of a substance-to-substance bond.

In a further embodiment, the second circular arc element is arranged inside a space, which is enclosed by the first circle element and the first circular arc element, wherein the second circular arc element is connected, in particular by means of a substance-to-substance bond, either to the first circle element at two contact points, to the first circular arc element at two contact points, or to the first circle element at one contact point, and to the first circular arc element at one contact point.

Due to the fact that the anti-resonance element preform has a first circle element and a first circular arc element as structural elements, the freedom in selecting the first circle radius and the first circular arc radius is larger than when exclusively using circle elements as structural elements to form the anti-resonance element preform.

In an embodiment, the first circle radius and the first circular arc radius have essentially the same value. When exclusively using circle elements to form the anti-resonance element preform, the corresponding structural units would not be accessible.

In a further design, the first circle radius has a larger value that the first circular arc radius.

An embodiment of the anti-resonance element preform is characterized in that the first circle radius has a smaller value than the first circular arc radius. When exclusively using circle elements to form the anti-resonance element preform, the corresponding structural units would not be accessible.

The first circle element and the first circular arc element can be arranged differently to one another, as long as both are connected to one another, in particular by means of a substance-to-substance bond, at minimum two, preferably exactly two, contact points.

An embodiment of the anti-resonance element preform is characterized in that the first circular arc element is arranged inside the first circle element. This means that the first circular arc element is connected, in particular by means of a substance-to-substance bond, to an inner side of the first circle element at two contact points. The first circular arc element is thus arranged on the inner side of the first circle element. This allows for a provision of circular or, in a three-dimensional view, of tubular anti-resonance element performs with improved optical properties, which can thus be handled easily. Such anti-resonance element preforms can be connected easily and with high structural precision to further components of a preform in order to produce an anti-resonant hollow-core fiber.

An embodiment of the anti-resonance element preform is characterized in that the first circular arc element is arranged outside of the first circle element. This means that the first circular arc element is connected, in particular by means of a substance-to-substance bond, to an outer side of the first circle element at two contact points. The first circular arc element is thus arranged on the outer side of the first circle element. This allows for the production of anti-resonance element preforms, which, in an axial top view, have the contour of an 8 or, depending on the respective radii of the first circle element and of the first circular arc element, have the contour of an irregular 8.

Furthermore, the invention relates to a method for producing an above-described anti-resonance element preform.

Depending on the desired design of the anti-resonance element preform, the method can be carried out in different ways.

A first embodiment of the method for producing an anti-resonance element preform according to any one of the above-described designs comprises at least the method steps (a) providing a first circle element, which is circular in axial top view, with a first circle radius;

(b) providing a first circular arc element, which is circular arc-shaped in axial top view, with a first circular arc radius;

(c1) arranging the first circular arc element (300) inside the first circle element (200), so that a first circular arc end (305) and a second circular arc end (306) are arranged on an inner side (205) of the first circle element (200);

(d) connecting, in particular connecting by means of a substance-to-substance bond, the first circular arc end and the second circular arc end by forming second contact points.

The first embodiment of the method for producing an anti-resonance element preform serves to produce the above-described anti-resonance element preforms, in the case of which the first circular arc element is arranged inside the first circle element. The first embodiment of the method can serve to produce essentially circular anti-resonance element preforms.

A second embodiment of the method for producing an anti-resonance element preform according to any one of the above-described designs comprises at least the method steps (a) providing a first circle element, which is circular in axial top view, with a first circle radius;

(b) providing a first circular arc element, which is circular arc-shaped in axial top view, with a first circular arc radius;

(c2) arranging the first circular arc element outside of the first circle element, so that a first circular arc end and a second circular arc end are arranged on an outer side of the first circle element;

(d) connecting, in particular by means of a substance-to-substance bond, the first circular arc end and the second circular arc end by forming second contact points.

The second embodiment of the method for producing an anti-resonance element preform serves to produce the above-described anti-resonance element preforms, in which case the first circular arc element is arranged outside of the first circle element. The second embodiment of the method can serve to produce anti-resonance elements with a contour, in axial top view, in the shape of an 8 or, depending on the corresponding radii of the first circle element and of the first circular arc element, in the shape of an irregular 8.

The connecting in method step (d) can take place in different ways in all embodiments of the method, for example via adhering, screwing, riveting, welding, nailing, or jamming.

An embodiment of the method for producing an above-described anti-resonance element preform is characterized in that the connecting in method step (d) takes place by means of a heat input.

The heat input serves in particular for the substance-to-substance bond of the first circle element and the first circular arc element at the contact points. The heat input has to take place in such a way that a substance-to-substance bond between the materials of the two elements is possible. This can be attained in such a way that the surfaces of the elements change at least partially from the solid state into the liquid, in particular viscous state, at least at the contact points.

The heat input can be realized in different ways, for example by means of:

flame-based processes: based on the oxidation of an exothermically reacting gas. One example is the use of hydrogen—also referred to as "H2"— as exothermally reacting combustion gas (the flame hydrolysis). It reacts with the oxygen—also referred to as "O2"—in the air; or flame-free processes: use other systems, which heat up and do not require an open flame. One example is the use of a resistor, which is able to convert electrical energy into thermal energy (heat).

Furthermore, the invention relates to a preform for producing an anti-resonant hollow-core fiber comprising a cladding tube, characterized in that at least one above-described anti-resonance element preform is arranged in the cladding tube.

The preform is the component, from which the anti-resonant hollow-core fiber can be drawn. In the alternative, the preform can be further processed into a secondary preform, from which the anti-resonant hollow-core fiber is drawn. This further processing can comprise a one-time or repeated performing of hot-forming processes, such as, e.g., elongating, collapsing, or adding additional cladding material.

A cladding tube is a tubular element made essentially of quartz glass, in which at least one of the above-described anti-resonance element preforms is arranged. When stretching the final preform into the final fiber, the cladding tube surrounds the hollow core of the anti-resonant hollow-core fiber. In an embodiment, the cladding tube has an inner diameter in the range of 10 to 60 mm. In an embodiment, the cladding tube has an outer diameter in the range of 25 to 250 mm, preferably of 30 to 200 mm. In an embodiment, the cladding tube has a length in the range of 500 to 1200 mm.

The at least one anti-resonance element preform can be arranged in different ways inside the cladding tube.

An embodiment of the preform is characterized in that the at least one anti-resonance element preform is connected to an inner surface of the cladding tube, in particular by means of a substance-to-substance bond. In an embodiment, the anti-resonance element preform is connected to the cladding tube via the first circle element. In a further design, the anti-resonance element preform is connected to the cladding tube via the first circular arc element, whereby in the case of these anti-resonance elements the first circular arc element is arranged outside of the first circle element.

In order to build the preform, a different number of anti-resonance elements can be arranged inside the cladding tube.

An embodiment of the preform is characterized in that 3 to 10, preferably 3 to 8, more preferably 4 to 6, antiresonance element preforms are arranged in the cladding tube.

In an embodiment, only those anti-resonance element preforms, which have the properties and features of the above-described anti-resonance element preforms, are arranged inside the cladding tube. In further designs, at least one anti-resonance element preform, which is arranged inside the cladding tube, has other features and properties than the above-described anti-resonance element preforms.

Furthermore, the invention relates to an anti-resonant hollow-core fiber, comprising in axial top view a cladding region and at least one anti-resonance element arranged in the cladding region, comprising a circular first circle structure with a first circle structure radius, and a circular arc-shaped first circular arc structure with a first circular arc structure radius, characterized in that the first circle structure and the first circular arc structure are connected to one another at two contact points.

The anti-resonant hollow-core fiber can be produced from the above-described preforms, in particular by elongating, wherein at least a part of the cladding region of the antiresonant hollow-core fiber is formed from the cladding tube of the preform, and the at least one anti-resonance element of the anti-resonant hollow-core fiber is formed from the at least one anti-resonance element preform of the preform. Therefore the first circle structure is built from the first circle element, and the first circular arc structure is built from the first circular arc element. The respective contact points are maintained.

The preform is stretched during the elongating. The elongating preferably takes place to scale, so that, for example, the shape and arrangement of the components or component parts of the preform, in particular of the first circle element and of the first circular arc element, are reflected in the elongated end product.

In an embodiment of the anti-resonant hollow-core fiber, the cladding region corresponds to the elongated cladding tube. In a further design, the cladding region corresponds to the cladding tube and to an overlay tube, which is added to the cladding tube prior to or during the elongating. "Adding" is to be understood as connecting, in particular by means of a substance-to-substance bond, of a cladding tube and an overlay tube, which takes place in particular by means of heat input and preferably by using a negative pressure applied between the cladding tube and the overlay tube.

To elongate and create the anti-resonant hollow-core fiber from the preform, the preform can be guided perpendicularly through a furnace. A lower end of the preform, from which the anti-resonant hollow-core fiber is drawn in the form of a cone, is thereby warmed up to drawing temperature, wherein the drawn fiber is subsequently cooled down from the drawing temperature by means of a gas stream, which is directed opposite to the drawing direction.

The properties and features disclosed in the description can be significant for various embodiment of the claimed invention, both separately and in any combination with one another. The properties and features disclosed for the anti-resonance element preforms, the preform, or the anti-resonant hollow-core fiber, are also disclosed for the method and vice versa.

FIGURES

The invention will be illustrated further in an exemplary manner below by means of figures. The invention is not limited to the figures.

FIG. 1 shows an axial top view onto an anti-resonance element preform comprising a first circle element and a first circular arc element FIG. 2 shows a further embodiment of an anti-resonance element preform, FIG. 3 shows a further embodiment of an anti-resonance element preform, FIG. 4 shows a further embodiment of an anti-resonance element preform, FIG. 5 shows a further embodiment of an anti-resonance element preform, FIG. 6 shows a further embodiment of an anti-resonance element preform, FIG. 7 shows a further embodiment of an anti-resonance element preform, FIG. 8 shows a further embodiment of an anti-resonance element preform, FIG. 9 shows a further embodiment of an anti-resonance element preform, FIG. 10 shows an axial top view onto a preform of an anti-resonant hollow-core fiber, FIG. 11 shows an axial top view onto an anti-resonant hollow-core fiber, and FIG. 12 shows a method for producing an anti-resonance element preform.

DESCRIPTION OF THE FIGURES

FIG. 2 shows a further embodiment of an anti-resonance element preform 100a. The embodiment according to FIG. 2 largely corresponds to the embodiment, which is described above and is illustrated in FIG. 1, so that a reference is made to the above description in order to avoid repetitions. A structure, which is repeated from the description of FIG. 1, has the same reference numeral. Modifications of a structure as compared to a structure shown in FIG. 1 have the same reference numeral with an additional letter a.

Figure 1:
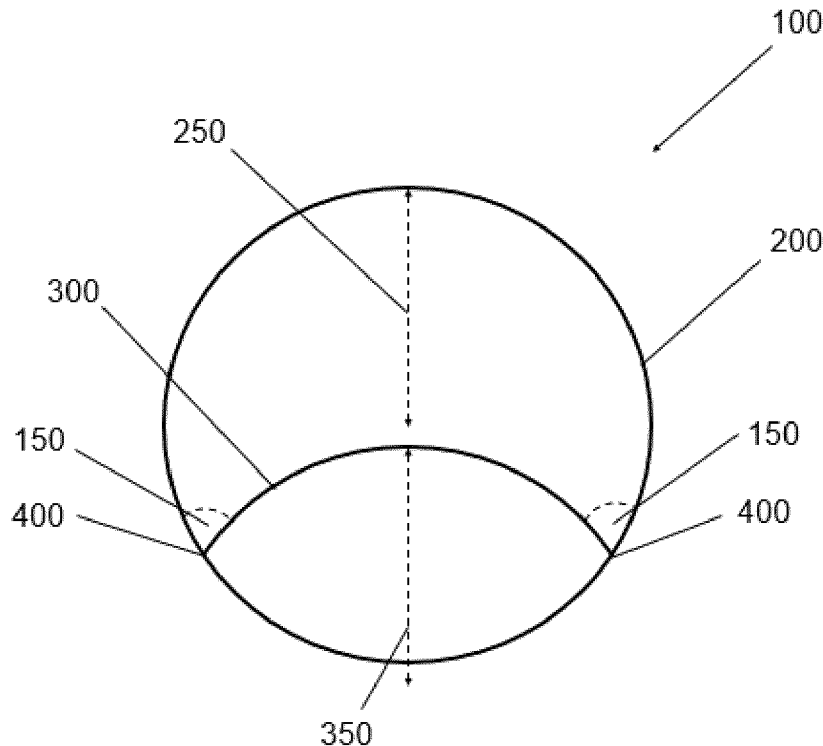
FIG. 1 shows an anti-resonance element preform 100 in an axial top view. The anti-resonance element preform 100 comprises a circular first circle element 200 with a first circle radius 250. A first circular arc element 300 with a first circular arc radius 350 is arranged inside the first circle element 200. In the shown embodiment of the anti-resonance element preform 100, the first circle radius 250 and the first circular arc radius 350 have the same value. The first circle element 200 and the first circular arc element 300 are connected to one another at two contact points 400, in particular by means of a substance-to-substance bond. At the contact points 400, the convex side of the first circular arc element 300 and the inner side of the first circular arc in each case draw an exterior angle 150, which have the same value due to the symmetrical setup of the anti-resonance element preform 100 in the shown embodiment. In further, non-illustrated embodiments, the two exterior angles 150 are not identical. In the illustrated embodiment, the first circle element 200 and the first circular arc element 300 are formed of identical material, in particular of a doped or undoped quartz glass.

In the shown embodiment, the first circle radius 250 has a larger value than the first circular arc radius 350a, whereby the exterior angle 150a is larger than the exterior angle 150 according to FIG. 1. Due to the first circular arc radius 350a, which is smaller compared to FIG. 1, the contact points 400a are also located closer together compared to the contact points 400 of FIG. 1.

Figure 2:
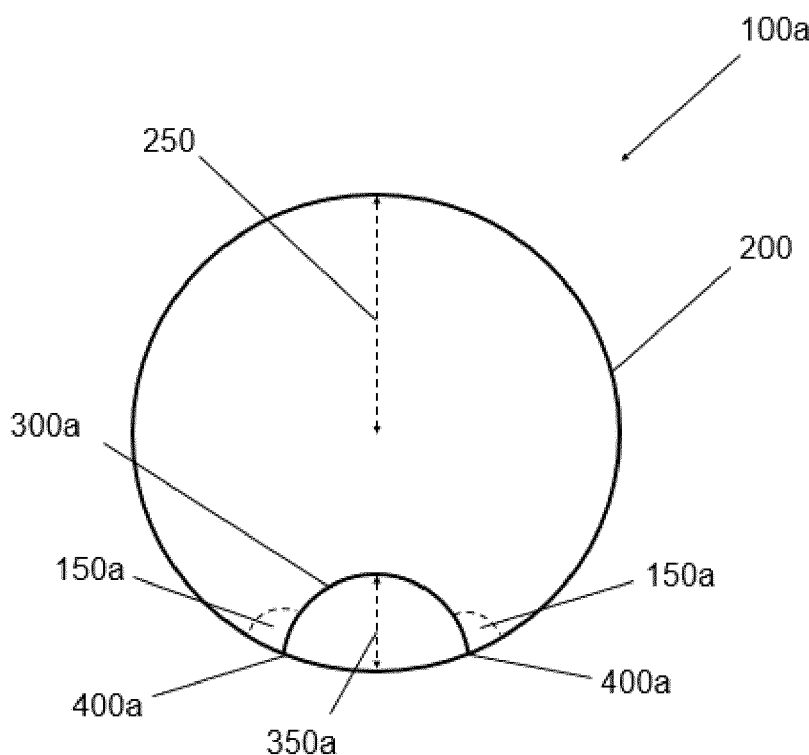
Figure 3:
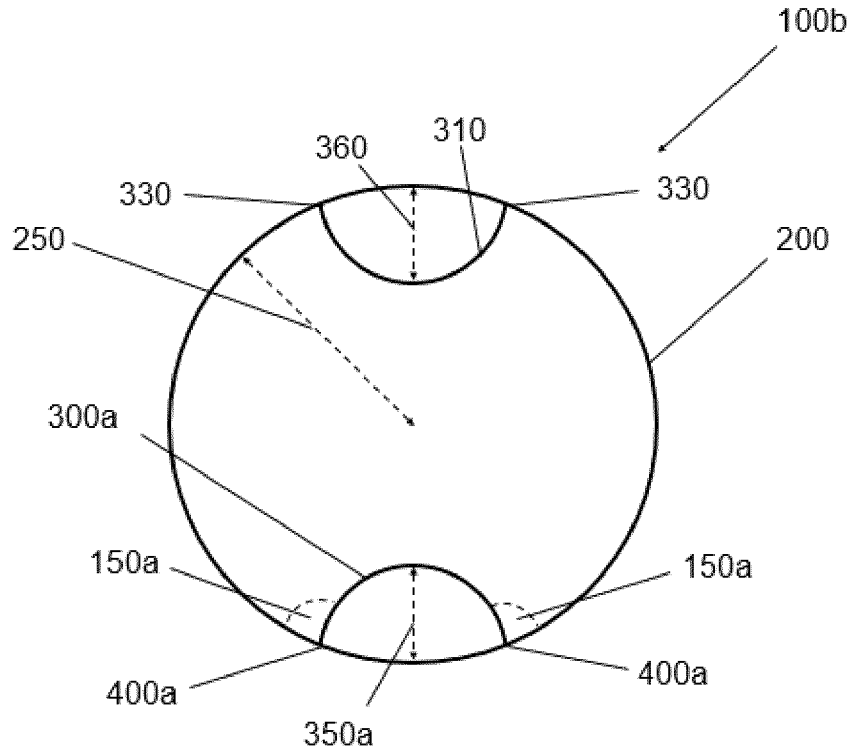

FIG. 3 shows a further embodiment of an anti-resonance element preform 100b. The embodiment according to FIG. 3 largely corresponds to the embodiments, which are described above and are illustrated in the above figures, so that a reference is made to the above descriptions in order to avoid repetitions. A structure, which is repeated from the description of the above figures, has the same reference numeral. The modifications of a structure as compared to a structure shown in the above figures have the same reference numeral with an additional letter b. Compared to the embodiment 100a in FIG. 2, the further embodiment of the anti-resonance element preform 100b has a circular arc-shaped second circular arc element 310 with a second circular arc radius 360. Just like the first circular arc element 300a, the second circular arc element 310 is arranged inside the first circle element 200, and is connected to the first circle element 200 at two contact points 330. In the shown embodiment, the first circular arc radius 350a and the second circular arc radius 360 have the same value. In further, non-illustrated embodiments, the first circular arc radius 350a and the second circular arc radius 360 can have different values. In the shown embodiment, the first circular arc element 300a and the second circular arc element 360 are arranged on opposite inner sides of the first circle element 200, so that the corresponding convex sides of the first circular arc element 300a and the second circular arc element 310 face one another. In further, non-illustrated embodiments, the first circular arc element 300a and the second circular arc element 310 are arranged in larger spatial proximity to one another on the inner side of the first circle element 200.

Figure 4:
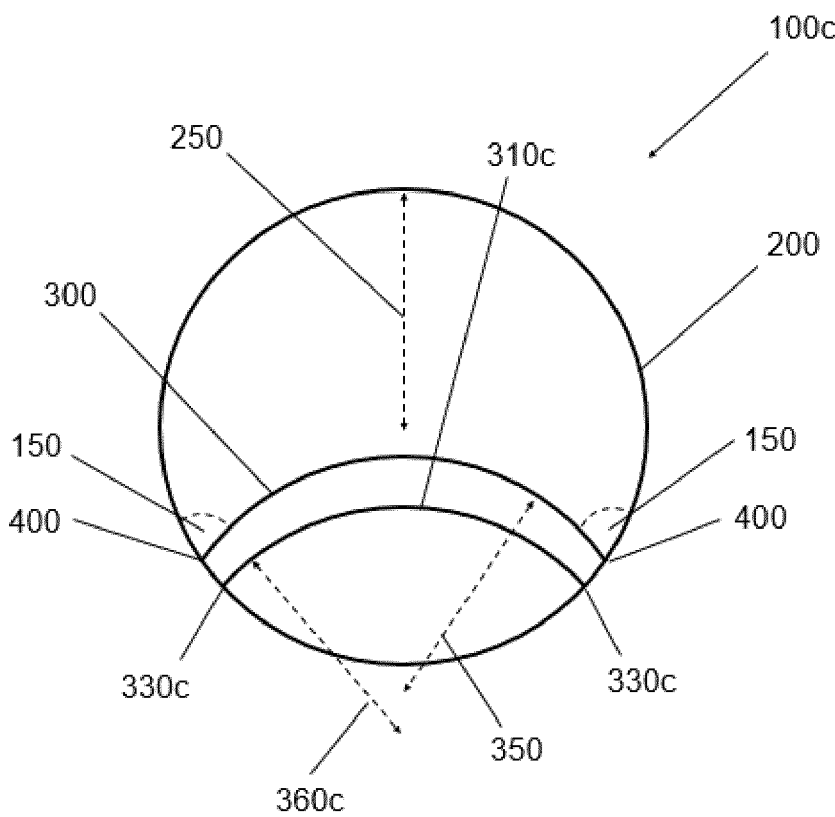

FIG. 4 shows a further embodiment of an anti-resonance element preform 100c. The embodiment according to FIG. 4 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter c.

In the shown embodiment, the second circular arc element 310c is arranged on the same side inside the first circular element 200 as the first circular arc element 300, wherein the first circular arc radius 350 and the second circular arc element 360c have the same value. The first circular arc element 350 and the second circular arc element 310c are arranged to one another in such a way that the convex side of the second circular arc element 310c faces the concave side of the first circular arc element 300. In further, non-illustrated embodiments, the first circular arc element 350 and the second circular arc element 310c are arranged to one another in such a way that the concave side of the second circular arc element 310c faces the concave side of the first circular arc element 350.

Figure 5:
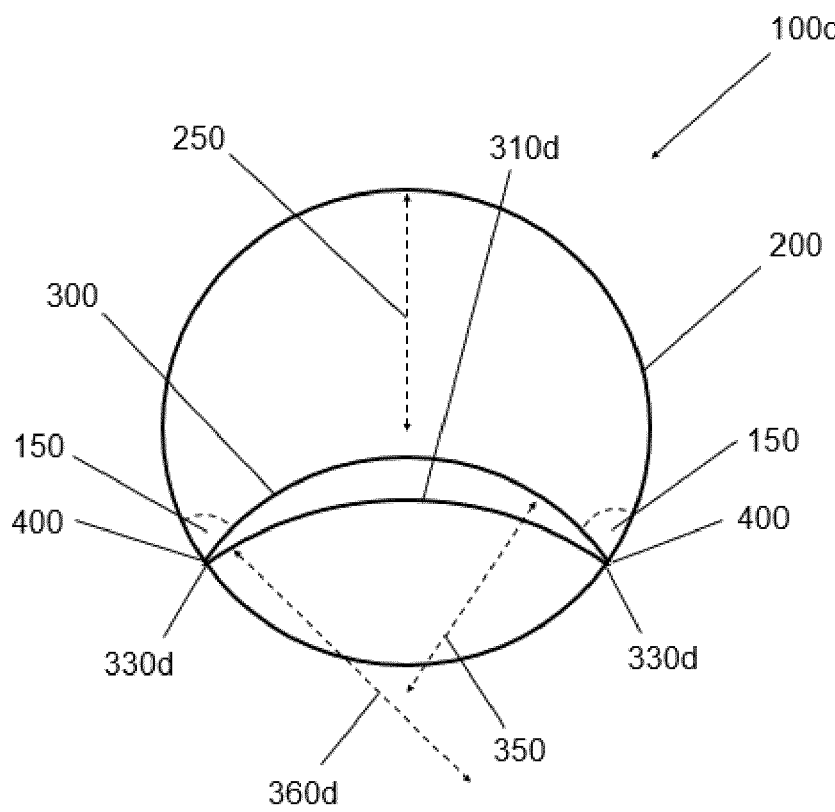

FIG. 5 shows a further embodiment of an anti-resonance element preform 100d. The embodiment according to FIG. 5 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter d.

In the shown embodiment of the anti-resonance element preform 100d, the second circular arc element 310d is arranged on the same side inside the first circular element 200 as the first circular arc element 300, as shown in FIG. 4, wherein the first circular arc radius 350 has a smaller value than the second circular arc radius 360d. The first circular arc element 300 and the second circular arc element 360 are arranged at the same points of the first circle element 200, so that the contact points 400 of the first circular arc element 400 and the contact points 330d of the second circular arc element 330 coincide with the first circular arc 200. The first circular arc element 350 and the second circular arc element 310d are arranged to one another in such a way that the convex side of the second circular arc element 310d faces the concave side of the first circular arc element 300. In further, non-illustrated embodiments, the first circular arc element 350 and the second circular arc element 310d are arranged to one another in such a way that the concave side of the second circular arc element 310d faces the concave side of the first circular arc element 350.

Figure 6:
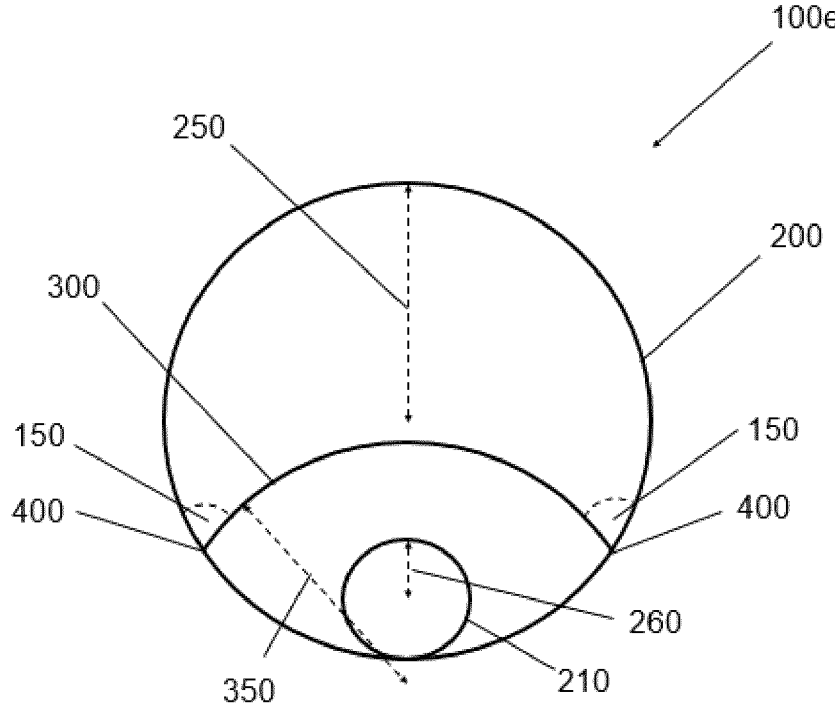

FIG. 6 shows a further embodiment of an anti-resonance element preform 100e. The embodiment according to FIG. 6 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter e.

The shown embodiment of the anti-resonance element preform 100e has a second circle element 210 with a second circle radius 260. The second circle element 210 is arranged inside a space that is formed by the inner side of the first circle element 200 and the concave side of the first circular arc element 300. Thereby the second circle element 210 is connected to the first circle element 200. In further, non-illustrated embodiments, the second circle element 210 is connected to the first circular arc element 300 or to the first circle element 200 and the first circular arc element 300. In further, non-illustrated embodiments, the second circle element 210 is arranged inside a space that is formed by the inner side of the first circle element 200 and the convex side of the first circular arc element 300, wherein the second circle element 210 is connected to the first circular arc element 300 and/or to the first circle element 200.

Figure 7:
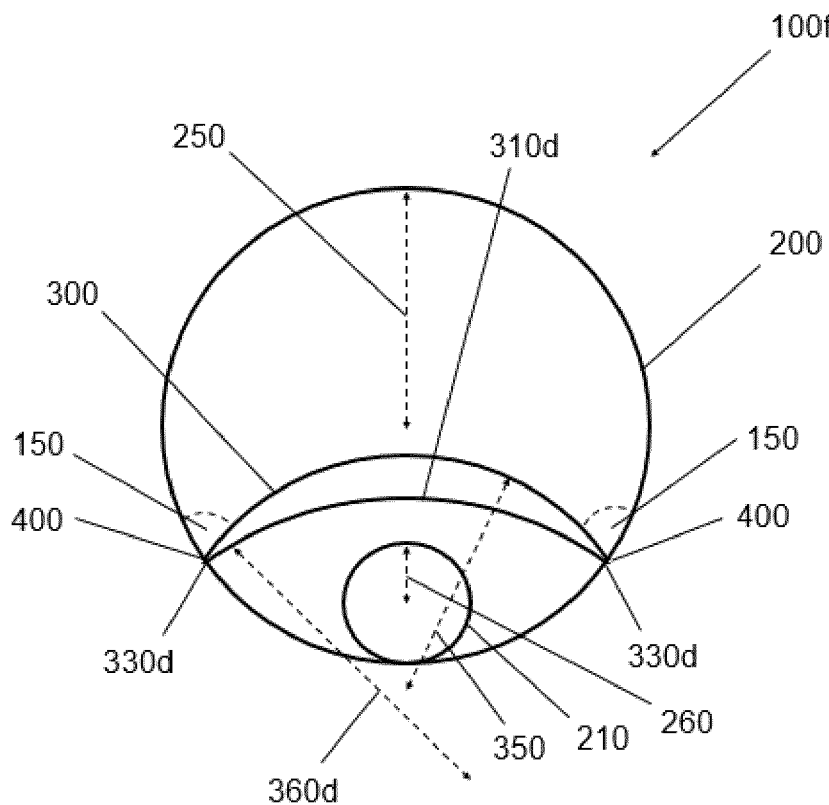

FIG. 7 shows a further embodiment of an anti-resonance element preform 100f. The embodiment according to FIG. 7 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter f.

In the shown embodiment, the second circle element 210 is arranged inside a space that is formed by the concave side of the second circular arc element 210d and the inner side of the first circle element 200. The second circle element 210 is thereby connected to the first circle element 200. In further, non-illustrated embodiments, the second circle element 210 is connected to the second circular arc element 210 or to the first circle element 200 and the second circular arc element 310d. In further, non-illustrated embodiments, the second circle element 210 is arranged in the space that is formed by the convex side of the first circular arc element 300 and the inner side of the first circle element 200. In further embodiments, the second circle element 210 is arranged in a space that is formed by the first circular arc element 300 and the second circular arc element 310d, wherein the second circle element 210 is either connected to the first circular arc element 300, the second circular arc element 310d, or the first circular arc element 300 and the second circular arc element 310d.

Figure 8:
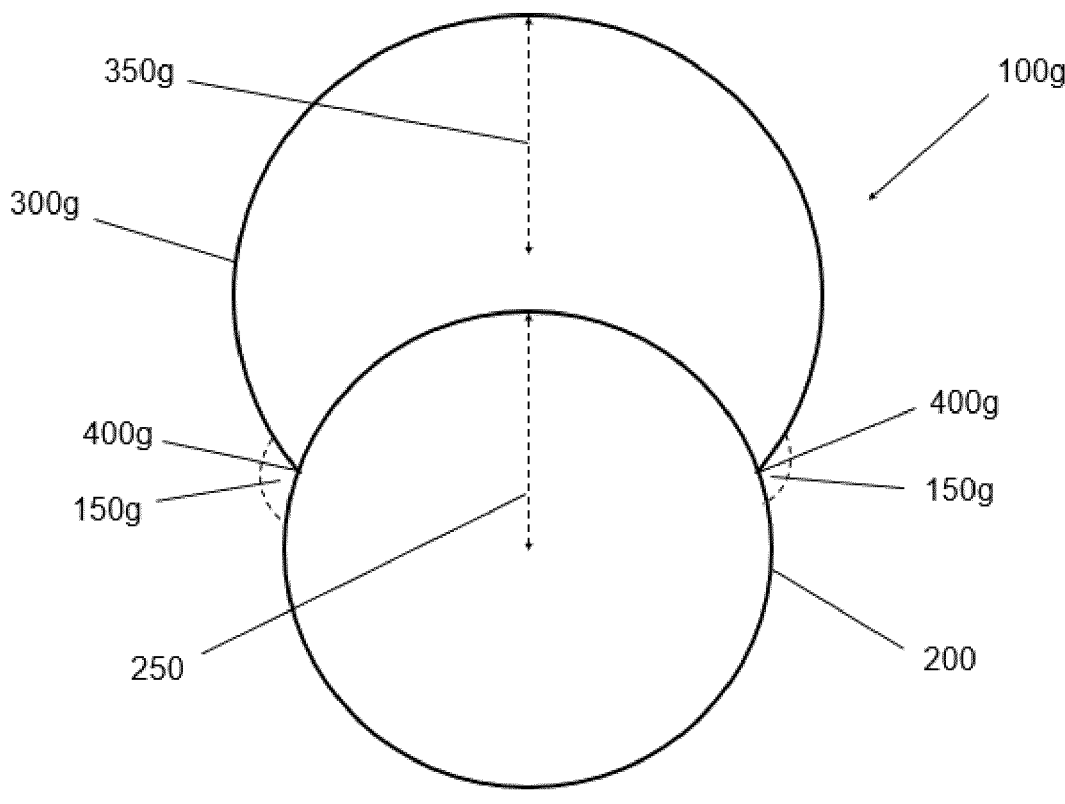

FIG. 8 shows a further embodiment of an anti-resonance element preform 100g. The embodiment according to FIG. 8 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter g.

The first circular arc element 300g is arranged outside of the first circle element 200 and is connected to the latter at two contact points 400g, wherein the first circle element 200 and the first circular arc element 300g each have the exterior angle 150g at the two contact points 400. The anti-resonance element preform 100g has a contour, which essentially corresponds to the contour of an 8. In the shown embodiment, the first circular arc radius 350g has a larger value than the first circle radius 250. In further non-illustrated embodiments, the first circular arc radius 350g has a value, which is equal to or smaller than the first circle radius 250.

Figure 9:
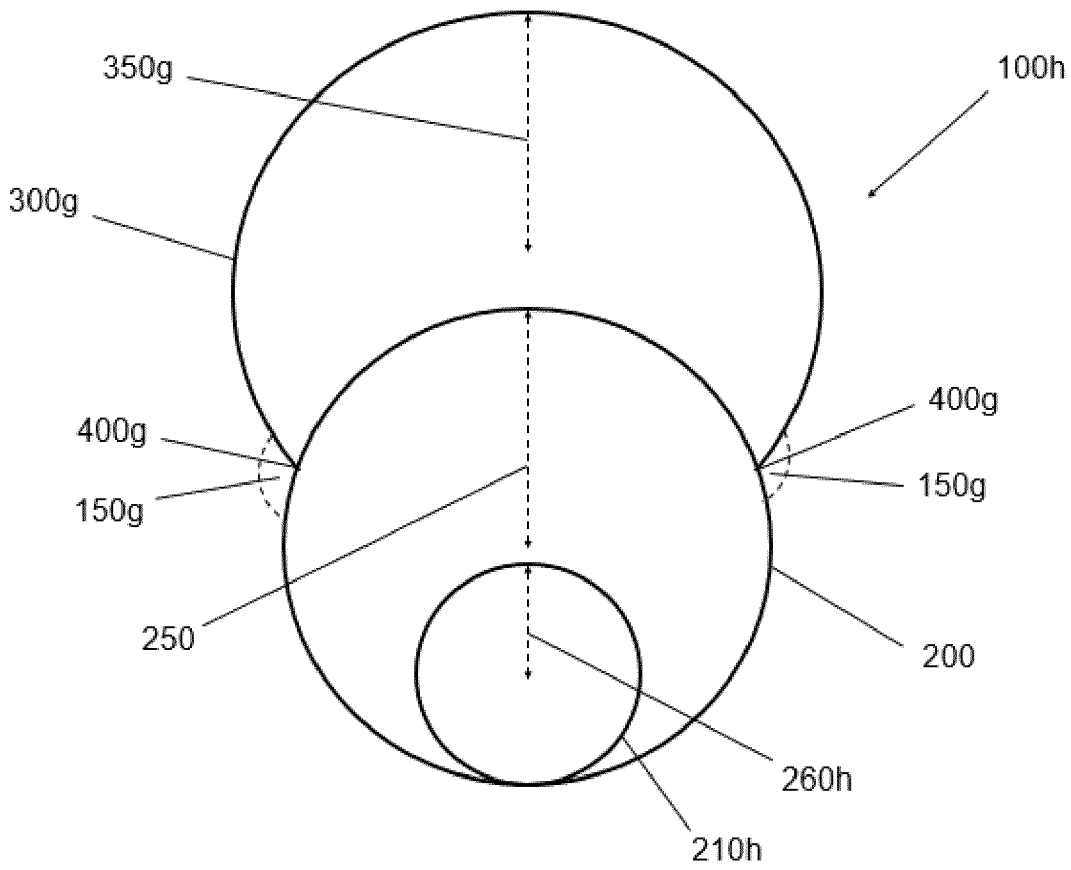

FIG. 9 shows a further embodiment of an anti-resonance element preform 100h. The embodiment according to FIG. 9 largely corresponds to the embodiments, which are described above and are illustrated in the above figures, so that a reference is made to the above descriptions in order to avoid repetitions. A structure, which is repeated from the description of the above figures, has the same reference numeral. Modifications of a structure as compared to a structure shown in the above figures have the same reference numeral with an additional letter h.

The shown embodiment has the first circular arc element 300g, which is arranged outside of the first circle element 200, and the second circle element 210h, which is arranged inside the first circle element 200, with a second circle element radius 260h, wherein the second circle element 210h and the first circular arc element 300g are arranged on the opposite sides of the first circle element 200. In further, non-illustrated embodiments, the first circular arc element 300g and the second circle element 210h are arranged on the same side of the first circle element 200. In further, non-illustrated embodiments, the second circle element 210h is arranged inside a space that is formed by the concave side of the first circular arc element 300g and the first circle element 200, wherein the second circle element 210g can be connected to the first circle element 200 and/or to the first circular arc element 300g.

Figure 10:
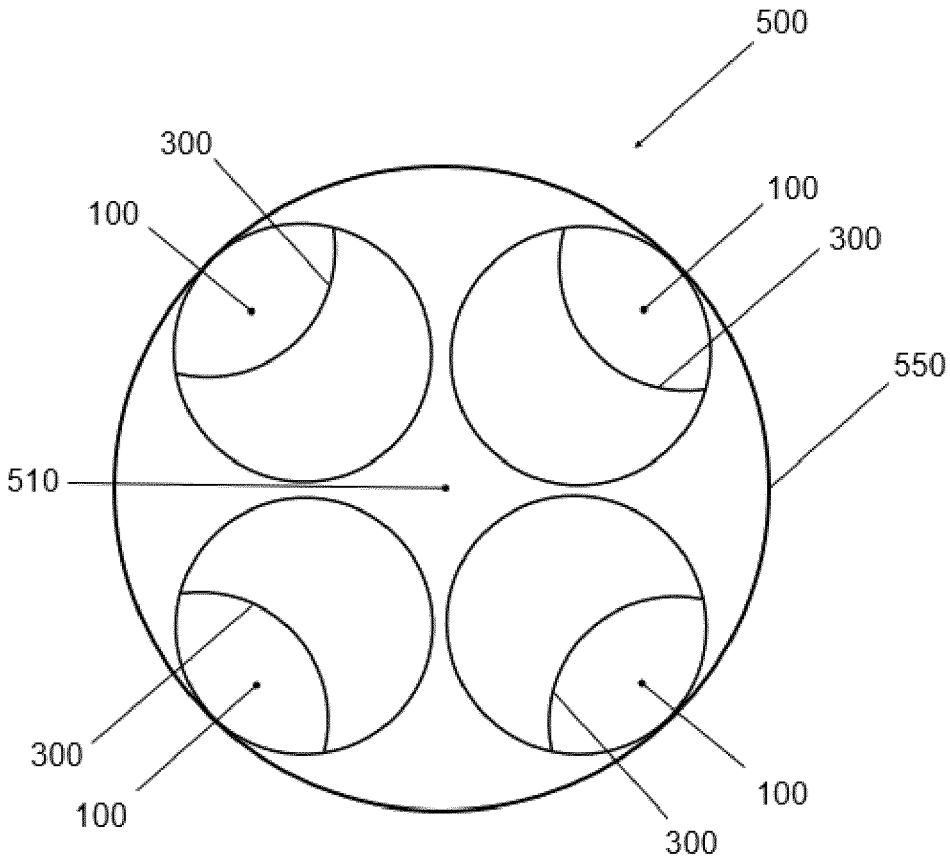

FIG. 10 shows a preform 500 comprising a cladding tube 550 and four anti-resonance element preforms 100 according to FIG. 1, which are arranged inside the cladding tube 550. In further, non-illustrated embodiments, the preform 500 comprises a different number, for example 2 to 10, of anti-resonance element preforms 100 and/or differently shaped anti-resonance element preform according to the invention, for example according to one of FIGS. 2 to 9, or the preform 500 comprises two or more different embodiments according to the invention of the anti-resonance element preforms, for example according to FIGS. 1 to 9.

In the shown embodiment, the four anti-resonance element preforms 100 are connected to an inner side of the cladding tube 550. The distribution of the anti-resonance elements 100 on the inner side of the cladding tube 500 is symmetrical, so that a symmetrical anti-resonant hollow-core fiber can be produced from the preform 500 by elongating the preform 500, which has improved optical properties. The four anti-resonance element preforms 100 are arranged at the cladding tube 550 in such a way that the convex side of the respective first circular arc elements 300 is aligned in the direction of a center 510 of the preform 500. In further, non-illustrated embodiments, the concave sides of the first circular arc element 300 can be aligned in the direction of the center 510, or a number of circular arc elements 300 can be aligned in the direction of the center 510 with the respective convex side, and a number of first circular arc elements 300 with the respective concave side. The arrangement of the circular arc elements 300 is preferably designed symmetrically with respect to the center 510.

Figure 11:
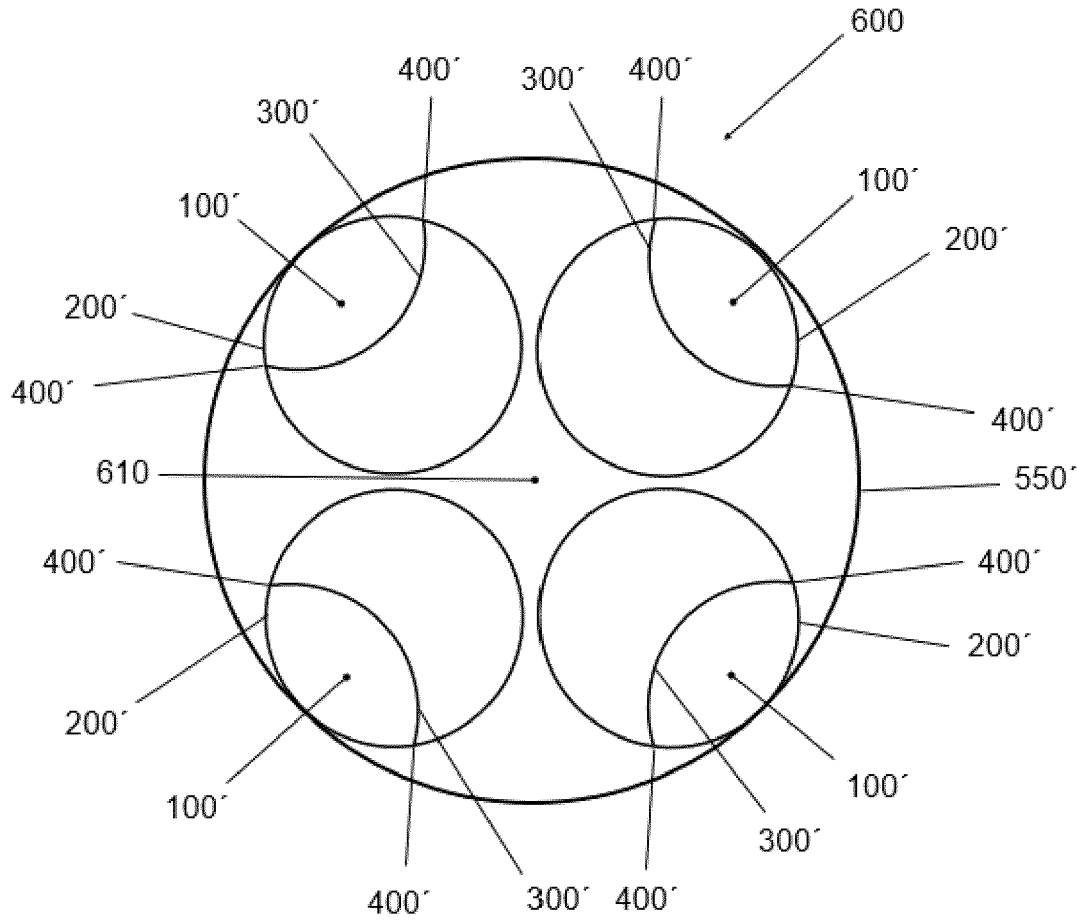

FIG. 11 shows an anti-resonant hollow-core fiber 600, which can be produced, for example, by elongating a preform 500 according to FIG. 10, comprising a cladding region 550' and four anti-resonance elements 100' arranged inside the cladding region 550'. In further, non-illustrated embodiments, the anti-resonant hollow-core fiber 600 comprises a different number, for example 2 to 10, of antiresonance elements 100'. The anti-resonance elements 100' have a circular first circle structure 200' and a circular arc-shaped first circular arc structure 300'. The first circular arc structures 300' are connected to one another with the respective first circle structures 200' at two contact points 400' each. In the shown embodiment, the anti-resonant hollow-core fiber 600 has structures, which can be obtained by elongating a preform 500 according to FIG. 10. In further, non-illustrated embodiments, the anti-resonant hollow-core fiber has differently shaped anti-resonance elements 100', which can be obtained through elongating by means of different anti-resonance element preforms according to the invention, for example according to FIGS. 2 to 9. The four anti-resonance elements 100' are arranged at the cladding region 550' in such a way that the convex side of the respective first circular arc structures 300' is aligned in the direction of a hollow-core fiber center 610 of the anti-resonant hollow-core fiber 600. In further, non-illustrated embodiments, the concave sides of the first circular arc structures 300' can be aligned in the direction of the hollow-core fiber center 610, or a number of circular arc structures 300' can be aligned in the direction of the hollow-core fiber center 610 with the respective convex side, and a number of first circular arc structures 300' with the respective concave side. The arrangement of the circular arc structures 300' is preferably designed symmetrically with respect to the hollow-core fiber center 610.

Figure 12:
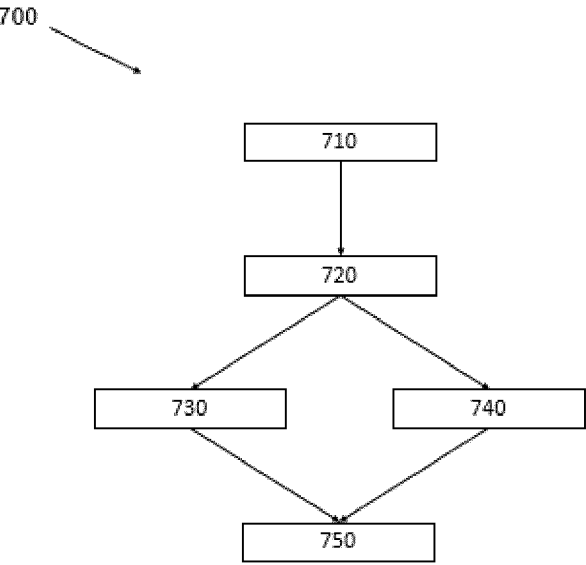

FIG. 12 shows a method 700 for producing an anti-resonance element preform 100. In a first embodiment, the method 700 comprises the method steps 710, 720, 730, and 740. In a second embodiment, the method 700 comprises the method steps 710, 720, 740, and 750.

Method step 710 comprises a provision of a first circle element 200, which is circular in axial top view, and method step 720 comprises a provision of a first circular arc element 300, 300a, 300g, which is circular arc-shaped in axial top view.

The first circle element 200 and the first circular arc element 300, 300a, 300g can be arranged differently to one another.

In the first embodiment of the method 700, the first circular arc element 300, 300a and the first circle element 200 are arranged to one another in a method step 730 in such a way that the first circular arc element 300, 300a is arranged on an inner side of the first circle element 200 with a first circular arc end and with a second circular arc end opposite to the first circular arc end. The first circular arc element 300, 300a is thus arranged inside the first circle element 200.

In the second embodiment of the method 700, the first circular arc element 300g and the first circle element 200 are arranged to one another in such a way in a method step 740 that the first circular arc element is arranged on an outer side of the first circle element 200 with the first circular arc end and with the second circular arc end. The first circular arc element 300g is thus arranged outside of the first circle element 200.

In a method step 750, the first circular arc end and the second circular arc end, and thus the first circular arc element 300, 300a, 300g, is connected to the first circle element 200. The connection in method step 750 can be realized in different ways, for example via adhering, clamping, or a fastening means, such as, for example, via a screw, a rivet, or a nail. In a preferred embodiment, the connecting in method step 750 takes place by means of a heat input.

The heat input serves in particular for connecting the first circle element 200 and the first circular arc element 300, 300a, 300g through a substance-to-substance bond at the contact points 400, 400a, 400g of the two elements. The heat input takes place in such a way that a substance-to-substance bond between the materials of the two elements is possible. This can be attained in a way that the surfaces of the elements change at least partially from the solid state into the liquid, in particular viscous state, at least at the contact points 400, 400a, 400g.

The heat input can be realized in different ways, for example by means of:

flame-based processes: based on the oxidation of an exothermically reacting gas. One example is the use of hydrogen—also referred to as "H2"—as combustion gas (the flame hydrolysis). Thereby the hydrogen reacts with the oxygen—also referred to as "O2"—in the air; or flame-free processes: use other systems, which heat up and which do not require an open flame. One example is the use of a resistor, which can convert electrical energy into thermal energy (heat).

REFERENCE NUMERALS

100, 100a, 100b, 100c, 100d, anti-resonance element preform
100e, 100f, 100g, 100h
100' anti-resonance element
150, 150a, 150g exterior angle
200 first circle element
200' first circle structure
210, 210h second circle element
250 first circle radius
260, 260h second circle element radius
300, 300a, 300g first circular arc element
300' first circular arc structure
310, 310c, 310d second circular arc element
330, 330c, 330d contact point of the first circle element and the second circular arc element
350, 350a, 350g first circular arc radius
360, 360c, 360d second circular arc radius
400, 400a, 400g contact point of the first circle element and the first circular arc element
400' contact point of the first circle structure and the first circular arc structure
500 preform
510 center of the preform
550 cladding tube
550' cladding region
600 anti-resonant hollow-core fiber
610 center of the anti-resonant hollow-core fiber
700 method
710 providing a first circle element
720 providing a first circular arc element
730 arranging the first circular arc element inside the first circle element
740 arranging the first circular arc element outside of the first circle element
750 connecting

The invention claimed is:

1. An anti-resonance element preform for producing an anti-resonant hollow-core fiber, in an axial top view comprising a circular first circle element with a first circle radius, a circular second circle with a second circle radius different from the first circle radius, and a circular arc-shaped first circular arc element with a first circular arc radius, Wherein the first circle element and the first circular arc element are connected to one another at two contact points.

2. The anti-resonance element preform according to claim 1, wherein the first circle element and the first circular arc element comprise a glass, in particular quartz glass, or a polymer, in particular consisting of glass, in particular quartz glass, or a polymer.

3. The anti-resonance element preform according to claim 1, wherein the anti-resonance element preform comprises a circular arc-shaped second circular arc element with a second circular arc radius.

4. The anti-resonance element preform according to claim 1, wherein the first circle radius has a smaller value than the first circular arc radius.

5. The anti-resonance element preform according to claim 1, wherein the first circular arc element is arranged inside the first circle element.

6. The anti-resonance element preform according to claim 1, wherein the first circular arc element is arranged outside of the first circle element.

7. A method for producing an anti-resonance element preform according to claim 1, comprising the method steps of (a) providing a first circle element, which is circular in axial top view;

(b) providing a first circular arc element, which is circular arc-shaped in axial top view;

(c1) arranging the first circular arc element inside the first circle element, so that a first circular arc end and a second circular arc end are arranged on an inner side of the first circle element;
or (c2) arranging the first circular arc element outside of the first circle element, so that a first circular arc end and a second circular arc end are arranged on an outer side of the first circle element;

(d) connecting the first circular arc end and the second circular arc end to the first circle element by forming second contact points.

8. The method according to claim 7, wherein the connecting in method step (d) takes place by means of a heat input.

9. A preform for producing an anti-resonant hollow-core fiber comprising a cladding tube, wherein at least one anti-resonance element preform according to claim 1 is arranged in the cladding tube.

10. The preform for producing an anti-resonant hollow-core fiber-according to claim 9, wherein the at least one anti-resonance element preform is connected to an inner surface of the cladding tube.

11. The preform for producing an anti-resonant hollow-core fiber according to claim 9, wherein 3 to 10 anti-resonance element preforms are arranged in the cladding tube.

12. An anti-resonant hollow-core fiber, in axial top view comprising a cladding region and at least one anti-resonance element arranged in the cladding region, comprising a circular first circle structure with a first circle structure radius a circular second circular element with a second circle radius different from the first circle radius, and a circular arc-shaped first circular arc structure with a first circular arc structure radius, Wherein the first circle structure and the first circular arc structure are connected to one another at two contact points.

13. The anti-resonant hollow-core fiber according to claim 12, produced by stretching a preform, the preform is an anti-resonance element preform for producing an anti-resonant hollow-core fiber, in an axial top view the preform comprises a circular first circle element with a first circle radius and a circular arc-shaped first circular arc element with a first circular arc radius, wherein the first circle element and the first circular arc element are connected to one another at two contact points, wherein at least one anti-resonance element preform is arranged in a cladding tube.

* * * * *